United States Patent
Oikarinen

(10) Patent No.: US 8,751,560 B2
(45) Date of Patent: *Jun. 10, 2014

(54) METHOD AND DEVICE ARRANGEMENT FOR MANAGING A CLIENT/SERVER ENVIRONMENT

(75) Inventor: Jarkko Oikarinen, Oulunsalo (FI)

(73) Assignee: Capricode Oy, Oulu (FI)

( * ) Notice: Subject to any disclaimer, the term of this patent is extended or adjusted under 35 U.S.C. 154(b) by 645 days.

This patent is subject to a terminal disclaimer.

(21) Appl. No.: 11/484,317

(22) Filed: Jul. 11, 2006

(65) Prior Publication Data

US 2007/0050447 A1 Mar. 1, 2007

(30) Foreign Application Priority Data

Jul. 12, 2005 (FI) ...................................... 20055406

(51) Int. Cl.
*G06F 15/16* (2006.01)
(52) U.S. Cl.
USPC .......................................... 709/203; 709/201
(58) Field of Classification Search
CPC .................................................. H04L 41/0893
USPC ................................................. 709/203, 201
See application file for complete search history.

(56) References Cited

U.S. PATENT DOCUMENTS

| 5,845,090 | A | * | 12/1998 | Collins et al. ................. | 709/221 |
| 5,860,012 | A | * | 1/1999 | Luu ................................. | 717/175 |
| 6,076,099 | A | * | 6/2000 | Chen et al. ..................... | 709/202 |
| 6,167,567 | A | * | 12/2000 | Chiles et al. ................... | 717/173 |
| 6,697,421 | B1 | * | 2/2004 | Monroe et al. ................. | 375/222 |
| 2002/0129340 | A1 | * | 9/2002 | Tuttle ............................. | 717/132 |
| 2003/0204640 | A1 | | 10/2003 | Sahinoja et al. | |
| 2004/0098715 | A1 | | 5/2004 | Aghera et al. | |

FOREIGN PATENT DOCUMENTS

WO  WO 2004/038546 A2  5/2004
WO  WO 2005/060388 A2  7/2005

OTHER PUBLICATIONS

SyncML Device Management Protocol, versio 1.1, Feb. 15, 2002, http://www.syncml.org/docs/syncml_dmprotocol_11_20020215.pdf, Koko dokumentti, Version 1.1, Feb. 15, 2002.
SyncML Device Management Protocol, Version 1.1, Feb. 15, 2002 http://www.syncml.org/docs/syncml_dmprotocol_11_20020215.pdf, Koko Dokumentti, Version 1.1, Feb. 15, 2001.

* cited by examiner

*Primary Examiner* — Dustin Nguyen
*Assistant Examiner* — Joel Mesa
(74) *Attorney, Agent, or Firm* — Volpe and Koenig, P.C.

(57) ABSTRACT

The invention relates to a method and data transfer arrangement for executing consecutive instructions in a client device (21) in a mobile device management server-client device environment (22, 21). The invention also relates to an instruction execution module utilized in the implementation of the method. In the procedure according to the invention, the device management server (22) forms the instructions to be executed in the client device (21) into an instruction sequence (200), which is transmitted to the client device (21). The instruction execution module in the client device breaks up the instruction sequence into command sequences and control structures. The instruction execution module executes the conditional commands belonging to the instruction sequence and specified by the control structures individually without the help of the device management server (22). After the execution of all the instructions, the client device (21) sends a message describing the success of the execution to the device management server.

18 Claims, 3 Drawing Sheets

METHOD AND DEVICE ARRANGEMENT FOR MANAGING A CLIENT/SERVER ENVIRONMENT

TECHNICAL FIELD OF THE INVENTION

The invention relates to a method for executing consecutive instructions in a client device in a mobile Device Management Server/Client Device environment. The invention also relates to a data transfer arrangement used in the implementation of the method, an instruction execution module in the client device and a computer program product, by which the instruction execution module can be implemented.

BACKGROUND OF THE INVENTION

Information available to people becomes easily dispersed to different devices and information systems. Part of the information available may be located in files in fixed networks on servers or personal computers, for example. On the other hand, terminal devices of various cellular networks, laptop computers or palm computers contain information, files and programs that are important to the user. Maintaining them in a way that the latest created version of each piece of information, file or program is always the one currently in use is a challenging task.

The management of up-to-date information in prior art decentralized information networks is an important issue. This is particularly true in the management of information and software contained by various mobile devices. Such management of information and files is generally called Device Management. Device management has the following characteristic features, among others: It enables one terminal device or server to remote control at least one other device. It also enables a program or a part thereof in a terminal device to be complemented by new information or parts of a program, which are located in another device. In addition, the validity of the licenses, or rights of use, of software is also managed by it. Device management may also comprise matters related to the management of rights (Digital Right Management).

Open Mobile Alliance (OMA) has published specifications, which concern the updating and maintenance of software in mobile devices. Some possible ways of implementing data transfer and up-to-date file maintenance of mobile devices are described in the specifications OMA DM (Device Management) and OMA DS (Data Synchronization). These specifications describe the SyncML (Synchronization Markup Language) protocol and how it is utilized.

FIG. 1 is an exemplary signal chart of the prior art operation in a server-client device environment according to the OMA standard. The transfer of information and commands between the client device 11 and the device management server 12 requires a large amount of data transfer between them. In the description below, the device management server is often also referred to by the general name server. The performance of a procedure in a client device may require the execution of a number of separate commands in a certain order. The server 12 has the responsibility for the execution of the commands, the client device 11 only implements the commands it has received one by time and reports the result to the server which gave the commands. The commands have originally been specified in a user application not shown in FIG. 1, which delivers the commands to the device management server for execution.

The conversation between the device management server 12 and the client device 11 can be like the following, for example. The conversation is started by the client, which may be, for example, the physical user of the client device 11 or the server 12 or some application program being executed in the server or client device or some third device not shown in FIG. 1. In the example of FIG. 1, the exchange of commands and messages between the device management server 12 and the client device 11 is started by the client's action. After this, the server 12 sends the first command, Ref. 13, to the client device 11 for execution. After the execution, the client device 11 sends information, Ref. 14, of the result of the operation back to the server 12 which sent the command. If the first command has been executed, the server 12 sends the next command, Ref. 15, to the client device 11. The client device executes the second command it has received and sends information of the execution of the second command back to the server. In any case, the server 12 has to check every reply message it has received before it can proceed to the execution of the next command in the instruction sequence. The reply message received from the client device 11 may also result in that the server must make a decision on which command is sent to the client device next.

The server 12 can also report to the requester of the instruction sequence, the above mentioned client, after each command executed.

The exchange of messages lasts until the server 12 sends the last command belonging to the instruction sequence to the client device 11, Ref. 18. The execution information of the command is returned by a message 19 to the server 12. If the message indicates that the execution of the last command was also successful, the message exchange between the server 12 and the client device 11 is stopped.

A central problem in wireless data transfer is the limited data transfer channel used. The prior art conversation between the server 12 and the client device 11 for executing the instruction sequence consumes the limited data transfer resources of the wireless system unnecessarily.

SUMMARY OF THE INVENTION

The aspects of the present invention are to provide a method and device arrangement, by the utilization of which the instruction sequence in the client device controlled by the server need not be implemented like a conversation, whereby the data transfer resources of the wireless system are saved.

The aspects of the invention are achieved by an arrangement in which the client device comprises an instruction execution module, which can independently execute the instructions it has received, after receiving from the server an instruction sequence by which the operations required by the client can be implemented in the client device.

The invention has the advantage that data transfer between the server and the client device taking place over the wireless link can be reduced.

Furthermore, the invention has the advantage that the data transfer capacity of the wireless link becoming free can be assigned for use by utility applications of other devices connected to the same wireless data transfer network.

The method according to the invention for executing consecutive instructions in a client device in a mobile device management server-client device environment is characterized in that in addition to the command sequences, an instruction sequence sent to the client device also comprises control structures containing conditional commands, which conditional commands are executed in the instruction execution module of the client device.

The data transfer arrangement according to the invention for executing consecutive instructions in a client device in a mobile device management server-client device environment is characterized in that for executing the commands, the instruction sequence sent to the client device also comprises, in addition to the command sequences, control structures containing conditional commands, which conditional commands are arranged to be executed in the instruction execution module of the client device.

The instruction execution module according to the invention in the client device is characterized in that it comprises:
- program means for receiving an instruction sequence transmitted by the device management server;
- program means for breaking up the instruction sequence into single instructions, which comprise either command sequences or control structures;
- program means for executing the control structures in the central processing unit of the client device;
- program means for drawing up a message describing the success of the execution of the instruction sequence, and;
- program means for sending a message describing the success to the device management server.

The computer program product according to the invention is characterized in that the computer program product comprises:
- computer program means for receiving an instruction sequence transmitted by the device management server;
- computer program means for breaking up the instruction sequence into single instructions, which comprise either command sequences or control structures;
- computer program means for executing the control structures in the central processing unit of the client device;
- computer program means for drawing up a message describing the success of the execution of the instruction sequence, and;
- computer program means for sending a message describing the success to the device management server.

Some advantageous embodiments of the invention are presented in the dependent claims.

The basic idea of the invention is the following: A mobile terminal device is provided with an instruction execution module, which can execute the control structures in the instruction sequence transmitted to it by the device management server, which include conditional instructions, such as IF, THEN, ELSE, WHILE, DO-UNTIL, FOREACH or CALL. In the method according to the invention, the device management server thus only sends an instruction sequence to the client device, in which the instruction execution module executes the instructions according to the instruction sequence. By utilizing the control structures, the instruction execution module according to the invention can also independently solve the situations in which some conditions have been set for the execution result of an individual instruction or if the feedback information of the execution of the command does not meet the set conditions. When the instruction sequence has been successfully executed or if some command cannot be executed, the client device sends a message about it to the server mentioned above. By the procedure according to the invention it is thus possible to reduce the need for data transfer significantly compared to the prior art instruction-by-instruction conversation.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Figure 1:
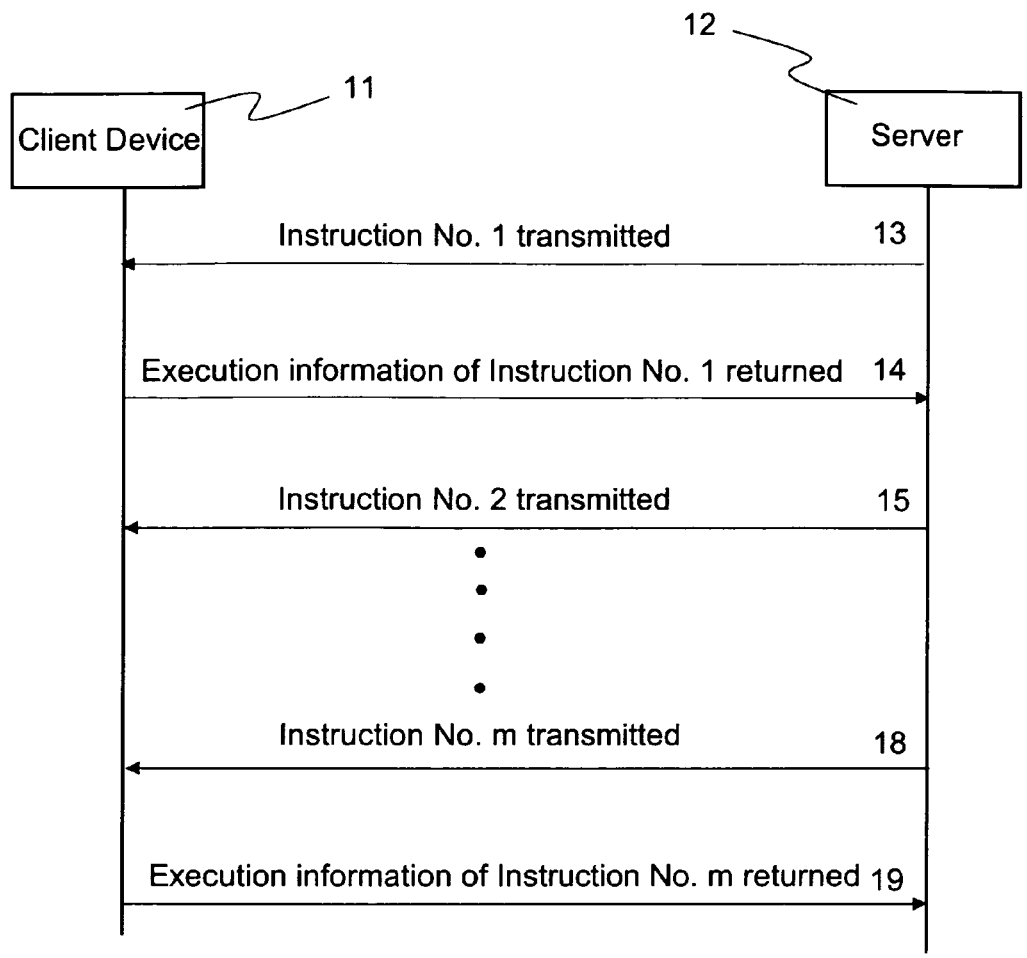
FIG. 1 shows a prior art device management procedure as an exemplary signal chart.

FIG. 1 was explained above in connection with the description of the prior art.

Figure 2B:
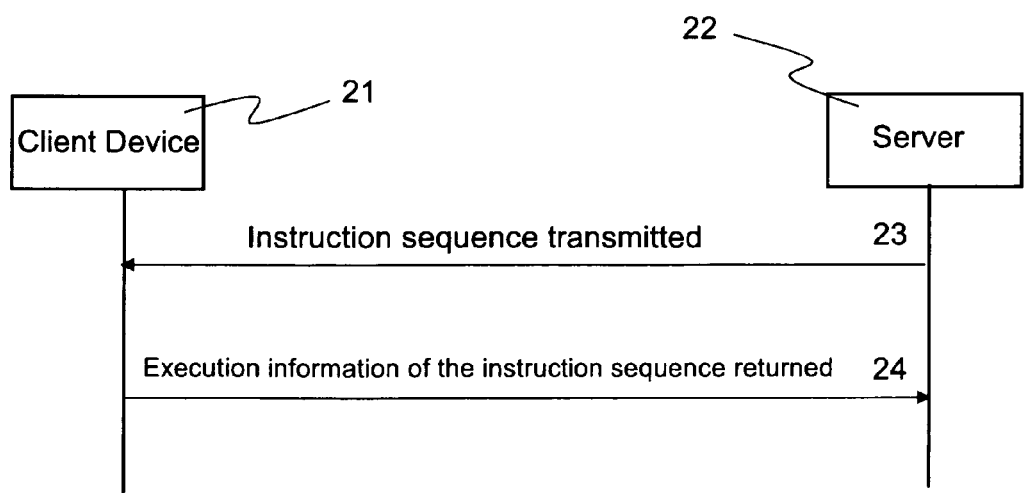
FIG. 2b shows the device management procedure according to the invention as an exemplary signal chart.
Figure 2A:
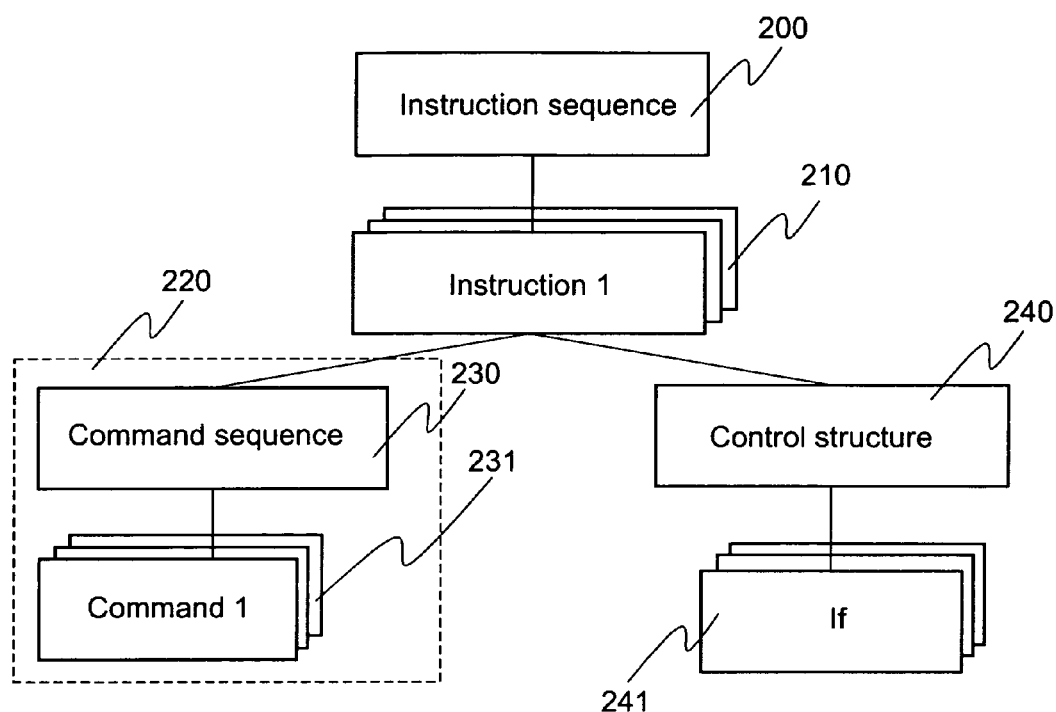
FIG. 2a shows how the control structures are associated with the instruction sequences in the procedure according to the invention.

FIG. 2a shows a hierarchical structure, which is utilized in the method and device arrangement according to the invention. The instruction sequence 200 contains all the instructions which the user application (not shown in FIG. 2a) orders to be implemented in the client device 21. The instruction sequence 200 contains a number of separate instructions 210. A single instruction 210 can be either a command sequence 230 or a control structure 240. The command sequence 230 is formed of separate commands 231, and there may be a plurality of them. The prior art SyncML protocol 220 comprises the command sequence-command entity shown in FIG. 2a.

In the operation according to the invention, the control structures 240 are utilized in the client device 21 in addition to the command sequences 230. The control structures 240 advantageously contain the following conditional commands as single commands 241 or combinations thereof: IF, THEN, ELSE, WHILE, DO-UNTIL, FOREACH and CALL. By using the control structures 240, the client device 21 according to the invention can independently manage control measures based on conditional commands, which used to belong to the user application or the device management server 22.

FIG. 2b shows, as an exemplary signal chart, how the change of data structure is implemented in the client device 21 using the device management procedure according to the invention. Ref. 22 denotes a device management server, from which the instruction to the change operation in the client device is received. In the procedure according to the invention, the device management server 22 sends an instruction sequence 200 consisting of single commands required for the execution of the operation to the client device 21, Ref. 23.

The client device 21 comprises an instruction execution module according to the invention, which has advantageously been implemented by program means installed in the client device 21. When the client device 21 has received the instruction sequence 200 transmitted by the server 22, the instruction execution module according to the invention executes the instructions 210 belonging to the instruction sequence. The instruction sequence 210 may include command sequences 230 and control structures 240, which include conditional commands, such as IF, THEN, ELSE, WHILE, DO-UNTIL, FOREACH and CALL in various combinations. The instruction execution module can execute all the control structures 240 included in the instruction sequence in the specified order and extent.

If, in connection with a command ordered to be executed, the procedure ends up in a state from which it is impossible for the instruction execution module according to the invention to proceed, the instruction execution module generates a fault report of the situation. The fault report is sent to the device management server 22.

If the instruction execution module according to the invention succeeds in executing the instruction sequence 200 in the specified manner, the instruction execution module sends a message describing the success of the instruction sequence to the device management server 22.

Both above described alternatives for the content of the feedback message are denoted by Ref. 24 in FIG. 2b.

FIG. 2b only shows the transmission of one instruction sequence 200 to the client device 21, Ref. 23, and the feedback message given by it, Ref. 24. However, the invention is not limited to one instruction sequence only, but it is possible to send a number of instruction sequences to the same client device, in which case a conversation is created between the device management server 22 and the client device 21 after each instruction sequence executed successfully. It is also possible that the device management server 22 first transmits all the instruction sequences one after another, and only after receiving the last instruction sequence, the client device 21 executes the instruction sequences it has received and gives a feedback message of them, either separately of each instruction sequence or of all together.

Figure 3:
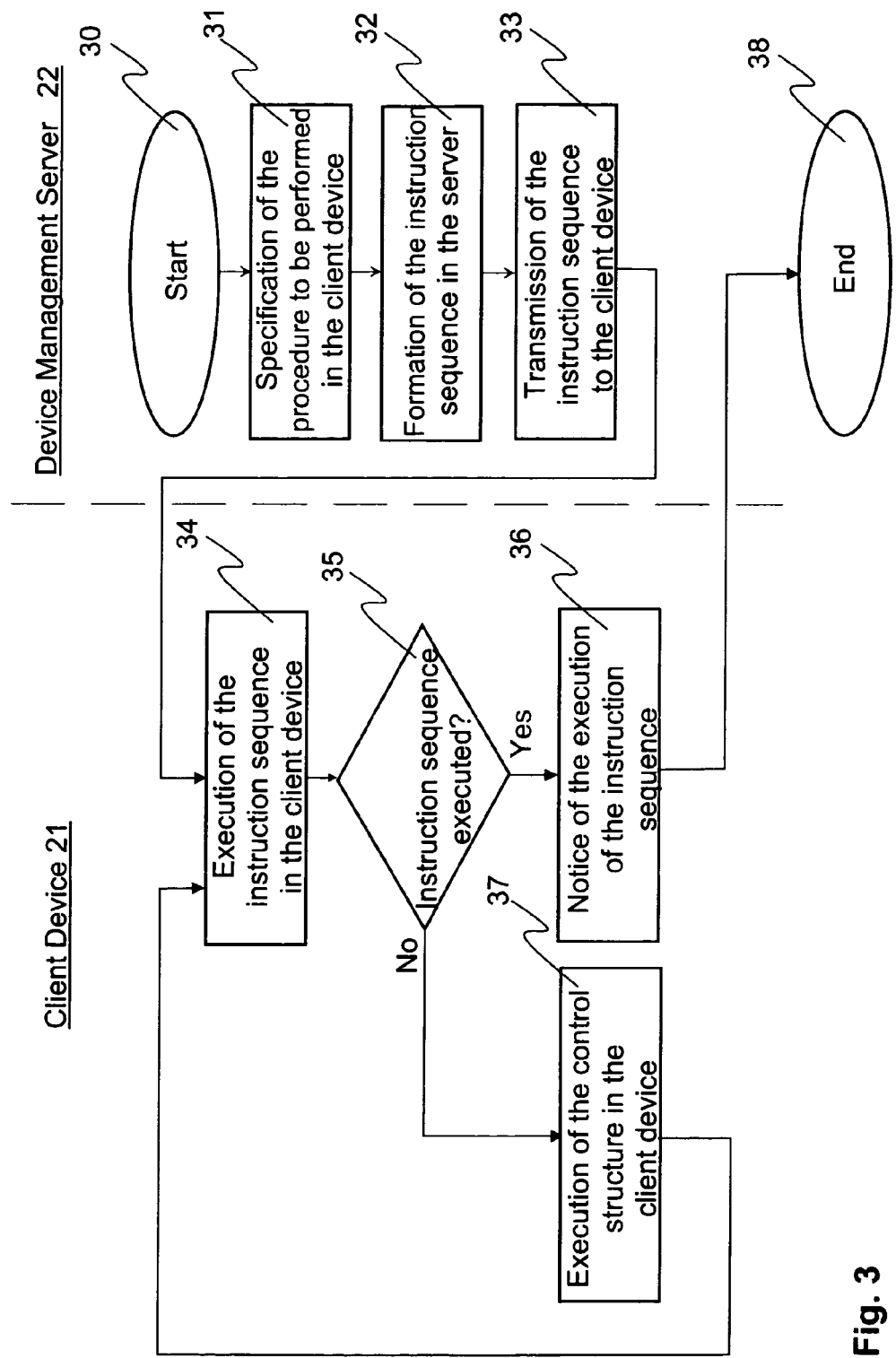
FIG. 3 shows, as an exemplary flow chart, the main steps of the device management procedure according to the invention.

FIG. 3 shows the main steps of the procedure according to the invention as an exemplary flow chart. The process starts from step 30, in which the physical user of the client device 21, device management server 22 or a third device or a program operating in them, which can all be called a client, starts an action, which as implemented causes a change in some data structure of the client device 21.

The measures required in the change are specified in step 31. The specification is preferably made by the user application (not shown in FIG. 2b), which can operate either in the device management server 22, client device 21 or some third device. In the same way, it is specified by what kind of instructions 210 to be executed in the client device the required measures can be performed. The specified instructions 210 are formed into an instruction sequence 200, which is transmitted by the device management server 22 to the client device 21 in step 33.

In step 34, the client device 21 receives the instruction sequence 200 transmitted by the device management server 22. The instruction sequence is recognized in the client device 21, and it is directed to the instruction execution module according to the invention, comprised in the client device. The instruction execution module breaks up the instruction sequence 200 into single instructions 210. The instructions may include both command sequences 230 and control structures 240. After this, the instruction execution module executes the instructions 210 in the order and extent specified by the instruction sequence 200 it has received.

In step 35 of FIG. 3 it is tested if the instruction sequence 200 has been executed in the client device 21. If all the instructions 210 included in the instruction sequence 200 received have been successfully executed, the procedure moves from step 35 to step 36, in which the client device 21 sends a notice of the successful execution of the instruction sequence 200 to the device management server 22, which transmitted the instruction sequence.

Another possible result of the determination in step 35 is that the instruction execution module finds that it either cannot execute an instruction of the instruction sequence 200 at all or the result of the execution of the instruction is not acceptable. In that case, branching takes place from step 35 to step 37, in which the instruction execution module in the first step utilizes the control structures 240 included in the instruction sequence 200 for solving the problem. It can, for example, generate new command sequences 230 by using the control structures 240. If the new command sequence can be executed, it is possible to move from steps 34 and 35 to step 36, in which a notice describing the successful execution of the instruction sequence is presented.

If the problem of executing the instruction cannot be solved by a new command sequence, which has been formed by using control structures in step 37, the instruction execution module advantageously generates a fault report by means of the control structures available to it after predetermined times of attempt. In this case, after steps 34 and 35, a fault report of an unexecuted instruction is presented in step 36. The fault report generated by the instruction execution module is sent to the device management server 22, which transmitted the instruction sequence.

From step 36, the process arrives at step 38, in which the result of the execution of the instruction sequence 200 is presented to the client which started the instruction operations. If the instruction sequence 200 has been executed successfully, a success report is presented to the client. If the execution of the instruction sequence has not succeeded, a fault report is presented to the client. In this case, the client makes the decision on further action.

A feature that is essential with regard to the implementation of the invention is the instruction execution module according to the invention, which is in the client device 21. The instruction execution module can advantageously be implemented by program means stored in the client device. All the measures to be performed in the method according to the invention can thus advantageously be performed in the processor unit of the client device as controlled by the instruction execution module. The instruction execution module according to the invention can be implemented by some prior art programming language.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wireless device management method for changing a data structure in a mobile client device by executing consecutive instructions in a mobile client device, the method comprising:

forming at least one device management instruction sequence by a device management server, the instruction sequence including:
command sequences including single commands to be executed in the mobile client device, and;
control structures containing conditional commands to be executed in the mobile client device;
transmitting the device management instruction sequence via a wireless link from the device management server to the mobile client device;
executing the device management command sequences and control structures of the instruction sequence by an instruction execution module of the mobile client device independently of the device management server; and
generating new command sequences by the instruction execution module of the mobile client device by executing the control structures in a case where the command sequences in the instruction sequence transmitted to the mobile client device cannot be executed or if the result of executing the command sequences in the instruction sequence transmitted to the mobile client device is unacceptable, whereby the device management instruction sequence is executed on the mobile client device as the new command sequence.

2. The method according to claim 1, wherein:
the device management instruction sequence is transmitted as one entity to the mobile client device;
the instruction execution module of the mobile client device executes the device management instructions belonging to the instruction sequence, and
the instruction execution module of the mobile client device sends a message describing the success of the execution of the device management instruction sequence to the device management server.

3. The method according to claim 2, wherein the instruction execution module of the mobile client device generates a fault report if even one of the device management instructions contained by the device management instruction sequence remains unexecuted or if the result of the execution does not comply with predetermined criteria.

4. The method according to claim 3, wherein the device management instruction sequence includes at least one control structure, which includes one or more of the following conditional commands: IF, THEN, ELSE, WHILE, DO-UNTIL, FOREACH or CALL.

5. The method according to claim 2, wherein the device management instruction sequence includes at least one control structure, which includes one or more of the following conditional commands: IF, THEN, ELSE, WHILE, DO-UNTIL, FOREACH or CALL.

6. The method according to claim 1, wherein the device management instruction sequence includes at least one control structure, which includes one or more of the following conditional commands: IF, THEN, ELSE, WHILE, DO-UNTIL, FOREACH or CALL.

7. A wireless device management arrangement for changing a data structure in a mobile client device, comprising:
a device management server; and
the mobile client device;
in which data transfer arrangement for executing device management instructions in the mobile client device:
the device management server is configured to form at least one device management instruction sequence, the device management instruction sequence including:
command sequences with single commands, and;
control structures containing conditional commands;
the device management server is configured to send the formed device management instruction sequence via wireless link to the mobile client device; and
a processor unit of the mobile client device is configured to:
execute the device management instruction sequence independently of the device management server; and
generate new command sequences by executing the control structures in a case where the command sequences in the instruction sequence transmitted to the mobile client device cannot be executed or if the result of executing the command sequences in the instruction sequence transmitted to the mobile client device is unacceptable, whereby the device management instruction sequence is executed on the mobile client device as the new command sequence.

8. The wireless device management arrangement according to claim 7, wherein:
the device management instruction sequence is configured to be transmitted as one entity to the mobile client device;
an instruction execution module of the mobile client device is configured to:
execute the instructions belonging to the device management instruction sequence in the processor unit; and
send a message describing the success of the execution to the device management server.

9. The wireless device management arrangement according to claim 8, wherein the instruction execution module of the mobile client device is further configured to generate a fault report if even one of the instructions contained by the device management instruction sequence remains unexecuted or if the result of the execution does not comply with predetermined criteria.

10. The device management arrangement according to claim 9, wherein the device management instruction sequence includes at least one control structure, which includes one or more of the following conditional commands: IF, THEN, ELSE, WHILE, DO-UNTIL, FOREACH or CALL.

11. The device management arrangement according to claim 8, wherein the device management instruction sequence includes at least one control structure, which includes one or more of the following conditional commands: IF, THEN, ELSE, WHILE, DO-UNTIL, FOREACH or CALL.

12. The wireless device management arrangement according to claim 7, wherein the device management instruction sequence includes at least one control structure, which includes one or more of the following conditional commands: IF, THEN, ELSE, WHILE, DO-UNTIL, FOREACH or CALL.

13. A mobile client device including an instruction execution module, the mobile client device comprising:
means for receiving a device management instruction sequence transmitted by a device management server for changing a data structure in the mobile client device;
means for breaking up the device management instruction sequence into single instructions, which include either command sequences or control structures;
means for generating new command sequences in a central processing unit of the mobile client device by executing the control structures if the command sequences in the instruction sequence transmitted to the mobile client device cannot be executed or if the result of executing the command sequences in the instruction sequence transmitted to the mobile client device is unacceptable, whereby the device management instruction sequence is executed on the mobile client device as the new command sequence;
means for drawing up a message describing the success of the execution of the device management instruction sequence, and;
means for sending a message describing the success to the device management server.

14. The mobile client device according to claim 13, further comprising:
means for receiving the device management instruction sequence as one entity from the device management server.

15. The mobile client device according to claim 14, further comprising:
means for executing conditional commands IF, THEN, ELSE, WHILE, DO-UNTIL, FOREACH or CALL, if the conditional commands are included in the device management instruction sequence transmitted by the device management server.

16. A mobile client device encoded with a computer program for creating an instruction execution module in the mobile client device, the computer program comprising:

computer readable code means for receiving a device management instruction sequence transmitted by a device management server;

computer readable code means for breaking up the device management instruction sequence into single instructions, which include either command sequences or control structures;

computer readable code means for generating new command sequences by utilizing the control structures if the command sequences in the instruction sequence transmitted to the client device cannot be executed or if the result of executing the command sequences in the instruction sequence transmitted to the client device is unacceptable, whereby the device management instruction sequence is executed on the mobile client device as the new command sequence;

computer readable code means for drawing up a message describing the success of the execution of the device management instruction sequence, and;

computer readable code means for sending a message describing the success to the device management server.

17. The mobile client device according to claim 16, further comprising computer readable code means for receiving the device management instruction sequence as one entity from the device management server.

18. The mobile client device according to claim 17, further comprising:

computer readable code means for executing conditional commands IF, THEN, ELSE, WHILE, DO-UNTIL, FOREACH or CALL, if the conditional commands are included in the instruction sequence transmitted by the device management server.

* * * * *